July 2, 1929.  N. P. SJOBRING ET AL  1,719,201

BRAKE SHOE AND HOLDER

Filed Feb. 15, 1927

WITNESS:
Tfred Palm
DEL.

INVENTORS:
Nils P Sjobring
Carl A Christenson
BY
Erwin, Wheeler & Woolard
ATTORNEYS.

Patented July 2, 1929.

1,719,201

UNITED STATES PATENT OFFICE.

NILS P. SJOBRING, OF CHICAGO, ILLINOIS, AND CARL ARTHUR CHRISTENSON, OF GOTTENBORG, SWEDEN.

BRAKE SHOE AND HOLDER.

Application filed February 15, 1927. Serial No. 168,417.

Our invention relates to an improved holder for brake shoes, whereby the shoe is sustained or supported upon its holder at or near its opposite ends, so that in the event of fracture of the shoe the broken parts thereof will be retained in position, and will continue to perform its functions in connection with the wheel of a railway car, until inspection reveals the defect.

The construction of the brake shoe holder is very simple, and is such as to permit quick replacement of the broken shoe by another one.

The invention will now be described in detail, and the novelty thereof pointed out in the appended claims.

Brake shoes of the present type are usually maintained upon their holders at a single connecting point, and are frequently subject to fracture, by reason of failure to support the same at its rear side in such manner that the support will be substantially coextensive with the area of the braking surface of the shoe. Under such conditions, a portion of the brake shoe will become loose and fall away, thus reducing the efficiency of the brake apparatus, and being sometimes contributive to disaster.

Figure 1:
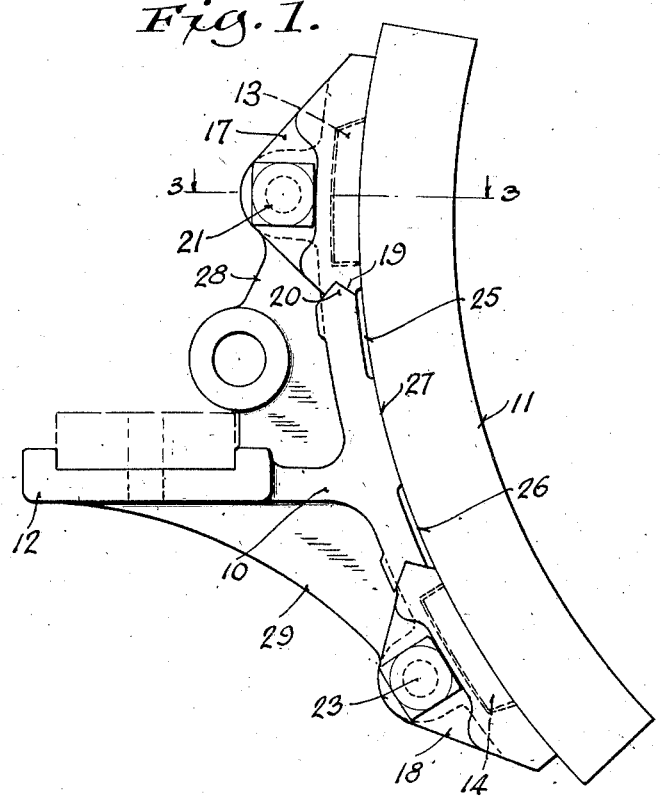
Figure 1 is a view in side elevation showing our improved brake shoe holder with a brake shoe therein.
Figure 2:
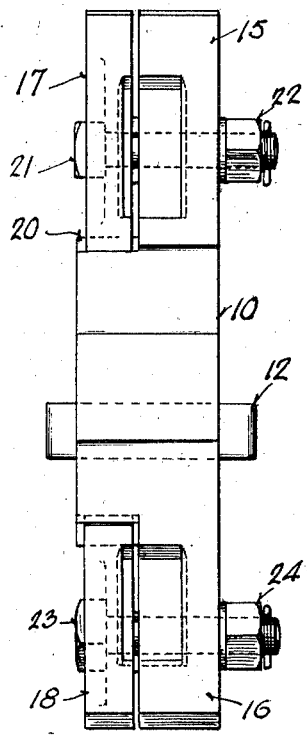
Fig. 2 is a view in elevation of the holder, looking from the right of Fig. 1, the brake shoe being omitted.
Figure 3:
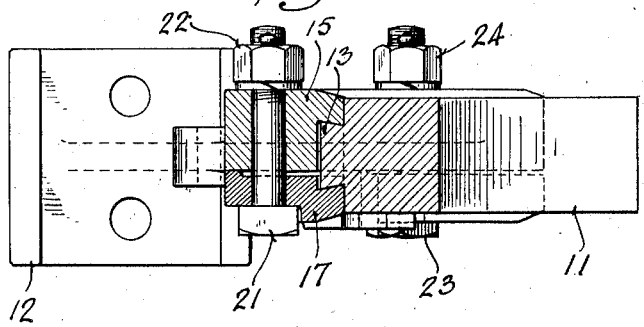
Fig. 3 is a horizontal sectional view on the line 3—3, Fig. 1.

In the drawing, the numeral 10 indicates a brake shoe holder constructed in accordance with our invention, and 11 a brake shoe attached thereto. The holder 10 is provided with a rearwardly extending arm 12, by means of which the holder may be attached to the usual swinging brake beam. The brake shoe 11 is formed from some hard, wear-resisting metal, and is provided upon its rear curved side with dovetail projections 13 and 14, of the form shown in Fig. 3. Near its ends, the brake shoe holder is cut away so as to form narrow portions 15 and 16 and form shoulders on which are arranged clamping members 17 and 18, which latter when in place, will substantially complete the brake shoe holder as rectangular, viewing it from the front, as in Fig. 2. The opposed faces of the narrowed portions 15 and 16 and of the clamping members 17 and 18, are formed with dovetailed recesses to receive the dovetailed projections 13 and 14 on the brake shoe.

The lower end of the clamping member 17 is provided with a transverse groove 19 which receives a transverse tongue 20 formed upon the brake shoe holder at the base of the narrowed portion 15, the tongue and groove connection being such as to guide and properly position the clamping member 17 upon the holder 10, the formation of the tongue and groove being such as to exclude moisture from lodgement therein. A similar tongue and groove connection is provided between the clamping member 18 and the brake shoe holder, for the same purpose. The projection 15 and the clamping member 17 are provided with aligned perforations, through which a bolt 21 is passed, the bolt being provided with a locking nut 22. By this means the upper dovetailed projection 13 on the brake shoe 11 is firmly clamped. A bolt 23, passed through aligned perforations in the lower projection 16 and the clamping member 18, and provided with a locking nut 24, serves in the same manner to clamp the lower dovetailed projection 14.

By means of the two clamping structures described, the brake shoe 11 is rigidly connected to the brake shoe holder 10. The arcuate face of the brake shoe holder 10 is concentric with that of the rear face of the brake shoe 11, so that a close line of contact between the meeting faces of the parts is maintained when the brake shoe is positioned upon its holder. However, shallow channels 25 and 26 may be cut transversely in the face of the holder, such channels being separated by a transverse ridge 27 on the holder, which ridge acts as an intermediate support for the brake shoe.

For the purpose of reenforcing the holder, webs 28 and 29 are provided between upper and lower ends of the holder and the arm 12.

The construction shown will effectively retain in position the parts of the brake shoe in the event that the latter becomes fractured while the car is in use, and will remain serviceable until inspection may show the necessity for replacement. The very simple clamping arrangements will permit replacement to be effected without difficulty.

Having thus described our invention, what we claim and desire to secure by Letters Patent of the United States, is:

1. A brake shoe holder having upper and lower arms, each provided with a dovetailed recess extending longitudinally of said arms, in combination with a brake shoe provided upon its rear side with dovetailed projections near its ends and adapted to enter the said recesses, and means upon the holder for clamping the projections in the recesses.

2. A brake shoe holder having upper and lower arms forming narrowed projections, clamping members co-operating with such projections, the opposed faces of the narrowed projections and the clamping members being formed with dovetailed recesses, in combination with a brake shoe having upon its rear side near its ends dovetailed projections adapted to enter the said recesses, and means on the brake shoe holder for clamping such projections in the said recesses.

3. An elongated brake shoe having dovetailed projections on its rear side near its ends, which dovetailed projections are disposed longitudinally of said shoe, in combination with a brake shoe holder having upper and lower arms provided with means for engaging the said projections, whereby the brake shoe is supported upon the holder at its opposite ends.

4. In combination, a brake shoe and a brake shoe holder, said holder having a rearwardly extending supporting arm disposed midway of its end portions, each of said end portions being provided with forwardly extending dovetailed projections and dovetailed clamping members, said brake shoe being provided with dovetailed portions co-operating with said dovetailed projections and said dovetailed clamping members.

5. In combination, a brake shoe holder having upper and lower arms, each of said arms having forwardly extending projections, clamping members cooperating with said projections, the opposed faces of said projections and said clamping members being formed with dove-tailed recesses and a brake shoe having upon its rear side near its ends dove-tailed portions adapted to enter said recesses, and means on said brake shoe holder for clamping said projections in said recesses, the lower face of the upper clamping member being grooved and the upper face of the lower clamping member being tongued to fit within complementary portions of said holder whereby to facilitate the shedding of moisture.

6. In combination, a brake shoe and a brake shoe holder, said holder having a rearwardly extending supporting arm disposed midway of its end portions, each of said end portions being provided with forwardly extending dovetailed projections and dovetailed clamping members, said brake shoe being provided with dovetailed portions cooperating with said dovetailed projections and said dovetailed clamping members, said clamping members including upper and lower members, the lower face of the upper clamping member being grooved and the upper face of the lower clamping member being tongued to fit within complementary portions of said holder whereby to facilitate the shedding of moisture.

In testimony whereof, we append our signatures.

Signed at Chicago, by NILS P. SJOBRING, on this 20th day of December, 1926.

NILS P. SJOBRING.

Signed at Gottenborg, Sweden, by CARL ARTHUR CHRISTENSON, on this 30th day of November, 1926.

CARL ARTHUR CHRISTENSON.